Patented Aug. 24, 1948

2,447,757

UNITED STATES PATENT OFFICE 2,447,757

PROCESS FOR TREATING CELLULOSE ETHERS TO IMPROVE THEIR DISSOLVING PROPERTIES

Leon Lilienfeld, deceased, late of Vienna, Germany, by Antonie Lilienfeld, administratrix, Winchester, Mass., assignor to Lilienfeld Patents, Inc., Boston, Mass., a corporation of Massachusetts No Drawing. Original application July 6, 1938, Serial No. 217,776. Divided and this application July 12, 1944, Serial No. 544,636. In Great Britain July 12, 1937

4 Claims. (Cl. 260—232)

The prior researches of this inventor have shown that alkali-soluble cellulose ethers exist which do not dissolve in aqueous caustic alkali solutions at room temperature, with the production of solutions which are sufficiently concentrated to serve for the direct production of artificial structures. Such ethers, in some instances do not dissolve at all therein, at room temperature. Some of such ethers do not dissolve except very incompletely, therein at room temperature. In certain cases even, this is equally true at some temperatures below room temperature, e. g. at some temperatures near 0° C. or somewhat above but below room temperatures they do not dissolve, but they do dissolve therein at very low temperatures, e. g. at minus 10° or at the freezing point of the solution. But such alkali-soluble cellulose ethers, of the stated properties are still highly useful for the manufacture of shaped structures having particularly useful properties.

The only way of bringing such ethers into substantially complete solution in aqueous solutions of caustic alkali, at room temperature, heretofore known, is the process described in British specification No. 212,864 to Lilienfeld which is based on the discovery that it is possible to obtain a solution of the whole substance of the cellulose ethers of the aforementioned types, in caustic alkali solution, at room temperature by contacting them with caustic alkali solution and cooling the thus obtained suspensions or incomplete solutions to a temperature between plus 5° C. and minus 25° C. until dissolved, and thereafter allowing the temperature to rise to room temperature or to a temperature between room temperature and 0° C.

In most cases, recourse must be taken to temperatures at which the suspensions or incomplete solutions freeze or form ice crystals, i. e. to temperatures which are considerably below 0° C., for example minus 10 to minus 15° C. and in certain cases even minus 20° C.

This shortcoming of the cellulose ethers of the aforementioned types is particularly serious with such users of alkali-soluble cellulose ethers as do not manufacture them themselves but purchase them from chemical concerns and who desire to produce shaped structures of supreme quality. Owing to the inability of such alkali-soluble cellulose ethers to dissolve in caustic alkali solution at room temperature or at a temperature not substantially lower than room temperature, such users have no other option but to go to the expense of fitting up and running a refrigeration plant or to content themselves with producing the articles in question from the hitherto known alkali-soluble cellulose ethers which will dissolve in caustic alkali solution at room temperature and which ethers are incapable of yielding shaped structures having so excellent properties as the shaped structures made from such cellulose ethers as can be dissolved only with the aid of freezing their suspensions or incomplete solutions in caustic alkali solution.

In addition, in many cases, the filtering capacity of the solutions of the cellulose ethers of the aforementioned types is rather poor; so much so, that frequently filtration through cotton wool is only possible with the aid of a pressure of 8 to 10 atmospheres or even more, and even then the filtration proceeds very slowly and also this only, when the cotton wool is changed from time to time.

The only process known hitherto for converting the alkali-soluble cellulose ethers of the aforementioned types into cellulose ethers which will dissolve at room temperature or at a temperature between 0° C. and room temperature consists in subjecting the cellulose ethers to the action of heat, preferably by treating them at a temperature not lower than 100° C. for a certain time, attended by a considerable reduction of the viscosity and thus by a degradation of the properties of shaped structures made from the initial cellulose ethers. Such a process is claimed in the copending application Ser. No. 159,606 of August 17, 1937 filed by Leon Lilienfeld (now Patent 2,265,919).

Moreover in cases in which the cellulose ethers are prepared by means of moderate proportions of etherifying agents (for example by means of 10 to 11 per cent, of ethylene chlorohydrin) the heating must be conducted at a temperature substantially exceeding 100° C. to yield a cellulose ether which will dissolve in caustic alkali solution at room temperature. Such temperature, however, decreases the viscosity of the cellulose ethers to a high degree and leads to final products yielding shaped structures having properties considerably inferior to the properties of the shaped structures obtainable from the cellulose ethers before heating.

Consequently, although very useful in all cases in which an improvement of the dissolving capacity of the cellulose ethers attended by a reduction of their viscosity is desired, the process in question is perfectly incapable of converting cellulose ethers which do not dissolve or do not completely dissolve in caustic alkali solution at room temperature with the formation of solutions having a concentration sufficient to be adapted for the production of shaped structures, into cellulose ethers which will dissolve therein at room temperature and which, nevertheless, excel by a high degree of viscosity and yield artificial structures having properties in no respect inferior to the properties of shaped structures produced from cellulose ethers which do not dissolve or only incompletely dissolve in caustic alkali solution at room temperature and which can be dissolved therein only by the refrigeration or freezing method.

Finally, even when conducted at temperatures considerably exceeding 100° C., the aforementioned heat treating process is incapable of producing cellulose ethers which will dissolve in caustic alkali solution at room temperature or at a temperature not substantially lower than room temperature from such cellulose ethers as are prepared with very small proportions of etherifying agents, for example with such proportions of etherifying agents as are set forth under item 10 of that part of the present specification which deals with the technical advance marked by the present process.

For the reasons explained above, the lack of cellulose ethers which will directly dissolve in caustic alkali solution at room temperature or at a temperature not substantially lower than room temperature, which have a viscosity warranting their capability of producing high-grade shaped structures and which can be worked up into shaped structures, in no respect inferior to the shaped structures obtainable from such cellulose ethers as can be dissolved or completely dissolved in caustic alkali solution by the freezing method only, is a long-felt want in the technology and the industrial utilization of alkali-soluble cellulose ethers.

The present invention supplies this desideratum in the chemistry and applied chemistry of alkali-soluble cellulose ethers in as much as it leads to cellulose ethers which will dissolve in caustic alkali solution at room temperature or at a temperature not substantially lower than room temperature and whose solutions nevertheless yield structures, such as artificial threads or film or the like, having properties of shaped structures produced from such cellulose ethers as can be dissolved only by the freezing operation.

The present invention resides in the discovery that cellulose ethers which will dissolve in caustic alkali solution at room temperature or at least at a temperature not substantially lower than room temperature and which excel by properties hitherto unobserved in any cellulose ether which will directly dissolve in caustic alkali solution at room temperature or at a temperature not substantially lower than room temperature are obtained:

When solutions of cellulose ethers which will not dissolve or will only incompletely dissolve in caustic alkali solution at room temperature or at a temperature not substantially lower than room temperature and which yield solutions sufficiently concentrated to be suitable for the preparation of shaped structures and other useful articles only when they are dissolved by cooling their suspensions or incomplete solutions in caustic alkali solution to a temperature at which freezing or formation of crystals occurs, or When solutions of cellulose ethers which will not dissolve or will only incompletely dissolve in caustic alkali solution at room temperature or at a temperature not substantially lower than room temperature and which yield solutions sufficiently concentrated to be suitable for the production of shaped structures and other useful articles only when they are dissolved at a temperature substantially lower than room temperature, Are precipitated by means of a precipitant selected from the group consisting of water, alkali carbonates and carbon dioxide or carbonic acid respectively.

The present invention further resides in the recognition that its most important and advantageous embodiment consists in using water as precipitant for the solutions of the cellulose ethers serving as initial materials in the present invention.

Consequently, the object of the present invention is the preparation of cellulose ethers which can be dissolved without freezing and in most cases at room temperature or at a temperature not substantially lower than room temperature, for example at plus 10° C., with the formation of solutions having concentrations sufficiently high for the production of shaped structures.

Other objects of the present invention will become apparent from the following description.

The technical advance of the present invention is marked by the following facts:

(1) The present invention produces for the first time cellulose ethers which, as compared with the alkali-soluble cellulose ethers known hitherto, exhibit unusually valuable properties.

On the one hand, by their ability to dissolve in caustic alkali solution at room temperature or at a temperature not substantially lower than room temperature they eclipse the cellulose ethers which can be dissolved in caustic alkali solution only by cooling their suspensions or incomplete solutions in caustic alkali solution to a low temperature, particularly to a temperature at which freezing or forming of crystals occurs.

On the other hand, they outshine the hitherto known cellulose ethers which will dissolve in caustic alkali solution at room temperature or at a temperature not substantially lower than room temperature by a degree of viscosity of their solutions, heretofore never observed in solutions of any known cellulose ether which dissolves in caustic alkali solution at room temperature; by the far better filterability, spinnability and stability of their solutions and, what is still more important, by the infinitely superior properties of the shaped structures produced therefrom.

Owing to these properties they take precedence of all alkali-soluble cellulose ethers known hitherto.

(2) The present invention produces for the first time cellulose ethers which, although they directly dissolve in caustic alkali solution at room temperature or at a temperature not substantially lower than room temperature, to give solutions having a viscosity equal to, or not far remote from, the viscosity of solutions of those cellulose ethers from which they are prepared and which can be only dissolved with the aid of the refrigeration or freezing process.

(3) The present invention produces for the first first time cellulose ethers which can be dissolved at room temperature or at a temperature not substantially lower than room temperature to yield solutions which are more concentrated than the solutions of these cellulose ethers from which they are prepared and which can be dissolved only with the aid of the refrigeration or freezing process.

(4) The present invention produces for the first time cellulose ethers which contain not more than one alcohol radical or hydroxy-acid residue per 2 or 3 or 4 $C_6H_{10}O_5$-molecular units of cellulose and even cellulose ethers which contain not more than one alcohol radical or hydroxy-acid residue per more than 4 or even more than 10 or 15 $C_6H_{10}O_5$-molecular units of cellulose and which, notwithstanding their low content in introduced alcohol radicals or hydroxy-acid residues, will readily and completely dissolve in caustic alkali solution at room temperature or at a temperature not substantially lower than room temperature with the formation of solutions which are sufficiently concentrated and viscous to be suitable for the production of shaped structures and which, owing to the fact that their cellulose residue is not or not substantially degraded and that their solutions have a considerable degree of viscosity, yield shaped structures of supreme quality.

(5) The present invention produces for the first time cellulose ethers which, although containing not more than one introduced alcohol radical or hydroxy-acid residue per 2 or 3 or 4 or more $C_6H_{10}O_5$-molecular units of cellulose, will as readily and completely dissolve in caustic alkali solution at room temperature or at a temperature not substantially lower than room temperature as the hitherto known cellulose ethers containing more than one alcohol radical or hydroxy-acid residue per 2 $C_6H_{10}O_5$-molecular units of cellulose, which will dissolve in caustic alkali solution at room temperature. The products of the present case give much more viscous solutions than the latter cellulose ethers, and their solutions yield shaped structures having properties infinitely superior to the properties of shaped structures obtainable from the latter cellulose ethers.

(6) The present invention produces for the first time cellulose ethers which can be dissolved in very dilute cautic alkali solution, such as caustic alkali solution of 4 or 5 or 6 per cent. strength at room temperature or at a temperature not substantially lower than room temperature, although they contain not more than one alcohol radical or hydroxy-acid residue introduced ether-fashion into the cellulose molecule per 2 or 3 or 4 or more $C_6H_{10}O_5$-molecular units of cellulose, although their cellulose component is not degraded or not substantially degraded and although they are capable of being worked up into shaped structures having dynamometric and other properties equal or not substantially inferior to the dynamometric properties of shaped structures obtained from such cellulose ethers as will not dissolve or will only partly dissolve at room temperature even in caustic alkali solution of higher strengths and which can be dissolved therein only by the refrigeration or freezing method.

(7) The present invention produces for the first time cellulose ethers the solutions of which, although prepared at room temperature or at a temperature not substantially lower than room temperature, filter much better and quicker than the solutions of the cellulose ethers from which they are prepared, even when their viscosity is equal to, or not far below, the viscosity of the solutions of the cellulose ethers from which they were produced and which can be dissolved only with the aid of the refrigeration or freezing method.

(8) The present invention produces for the first time alkali-soluble cellulose ethers which can be dissolved in caustic alkali solution at room temperature or a temperature not substantially lower than room temperature with the formation of solutions having a concentration suitable for the production of shaped structures.

(9) The present invention produces for the first time cellulose ethers the solutions of which, with regard to their stability and spinnability surpass the solutions of those cellulose ethers from which they are prepared and which can only be dissolved with the aid of the refrigeration or freezing process.

(10) The present invention offers for the first time the possibility of producing cellulose ethers which contain almost catalytic proportions of alcohol radicals or hydroxy-acid residues linked ether-fashion to the cellulose molecule and which, nevertheless, will dissolve in caustic alkali solution at room temperature or at a temperature not substantially lower than room temperature with the formation of solutions concentrated enough to be suitable for the manufacture of shaped structures.

And more than that: It is possible to prepare according to the present invention cellulose ethers which will dissolve in caustic alkali solution at room temperature or at a temperature not substantially lower than room temperature with the formation of solutions which have a concentration sufficient for the production of shaped structures, from such cellulose ethers as are prepared, by acting upon alkali cellulose with one mol. of an alkylating agent per about 20 or 30 or 50 $C_6H_{10}O_5$—molecular units of cellulose, or with one mol. of a hydroxy-alkylating agent per about 13 or per 27 or even per about 40 to 50 $C_6H_{10}O_5$-molecular units of cellulose or by acting with one mol of a mono-halogen fatty acid, upon similar amounts of cellulose.

Since, in the etherifying operation, not the whole amount of the etherifying agent added to the alkali cellulose is used up for the substitution of hydroxyl hydrogen atoms of the cellulose molecule, the number of alcohol radicals which are contained in the cellulose ethers is in general considerably smaller than the number of alcohol radicals computed on the basis of the proportions of the etherifying agents used.

Consequently, not only the proportions of etherifying agents used for the preparation of these cellulose ethers can be regarded as almost catalytic, but also, and with still more justification, the ratios of introduced alcohol radicals contained in the final ethers themselves.

Apart from being a technical advance, the possibility of producing cellulose ethers which contain so incredibly low ratios of introduced alcohol radicals to $C_6H_{10}O_5$ and which will dissolve in caustic alkali solution at room temperature or at a temperature not substantially lower than room temperature, is a surprising feature of the present invention.

(11) The present invention produces for the first time cellulose ethers which, although they will dissolve in caustic alkali solution at room temperature or at a temperature not substantially lower than room temperature, can be worked up into shaped structures excelling by unusually valuable properties, particularly by exceptional strength, extensibility, flexibility, elasticity and brilliance, excellent dyeing properties and attractive appearance. In point of fact, with regard to their properties, the shaped structures produced from the cellulose ethers prepared according to the present invention are not in the least inferior, and are in many cases even superior to the shaped structures produced from those cellulose ethers from which they are produced and which can be only dissolved with the aid of the refrigeration or freezing method.

(12) The present invention offers the possibility of a direct (when water is used as precipitant) or an indirect (when an alkali carbonate or carbon dioxide is used as precipitant) recovery of the caustic soda contained in the solution of the initial cellulose ether and (when an alkali carbonate is used as precipitant) also of the precipitating agent in the form of an alkali carbonate or, by way of causticisation, in the form of the corresponding alkali hydroxide.

When confronted with the following facts, the chemical and technical results and effects of the present invention are highly surprising.

(1) Heretofore, solutions of alkali-soluble cellulose ethers prepared by the refrigeration or freezing method were coagulated only in the shaped condition and also this with the sole object of gelling out shaped structures, such as threads, films, coatings or layers of any kind, dressings of fabrics, or sizing of yarn or the like. Never were solutions of alkali-soluble cellulose ethers prepared by the refrigeration or freezing method precipitated with the object of preparing specially valuable parent materials for the manufacture of shaped structures.

Hence, the cognition that is possible to prepare from cellulose ethers which will not dissolve or will only incompletely dissolve in caustic alkali solution at room temperature, cellulose ethers which will dissolve therein at room temperature or at a temperature not substantially lower than room temperature and which, nevertheless, yield shaped structures of high quality is not only novel but also surprising.

(2) It has been further established and is therefore generally assumed in the art:

(a) That shaped structures coagulated out of solutions of alkali-soluble cellulose ethers produced by the refrigeration or freezing method are usually characterized by a decrease in solubility in caustic alkali solution upon transition from the solution to the solid state.

(b) That they do not so readily dissolve in caustic soda solution as do those cellulose ethers which will dissolve in caustic alkali solution at room temperature or at a temperature not substantially lower than room temperature, i.e. which contain more than one introduced alcohol radical or hydroxy-acid radical per 2 or more $C_6H_{10}O_5$-molecular units of cellulose, and (c) That therefore cellulose ethers gelled from cellulose ether solutions prepared by the refrigeration or freezing method will not dissolve in caustic alkali solution, except by freezing or an equivalent dispersion process.

And even the present inventor, who had been incessantly working at alkali-soluble cellulose ethers and at their conversion into shaped structures since 1921 (see British Specification No. 177,810) and who, for the first time contrived and disclosed the refrigeration or freezing method for dissolving such alkali-soluble cellulose ethers as will not dissolve therein at room temperature or at a temperature not substantially lower than room temperature in 1923 (see British Specification No. 212,864, for example page 3, lines 62 to 71), had hitherto assumed that gels or precipitates obtained by the precipitation of shaped or shapeless solutions prepared by refrigerating (particularly by freezing) suspensions or incomplete solutions in caustic alkali solution of such cellulose ethers as do not dissolve or only incompletely dissolve therein at room temperature or at a temperature not substantially lower than room temperature i. e. of such cellulose ethers as contain not more than one alcohol radical or hydroxy-acid radical per 2 or 3 or 4 or more $C_6H_{10}O_5$-molecular units of cellulose, must be incapable of dissolving (or incapable of wholly dissolving) in caustic alkali solution at room temperature, or at a temperature not substantially lower than room temperature.

This assumption was well founded since, according to what was known about the properties of precipitates produced by neutralisation or acidification of solutions of alkali-soluble colloids (or even crystalloids) it could have been believed that the properties, particularly the ability of a cellulose ether precipitated by neutralisation of its solution in caustic alkali solution to again dissolve in caustic alkali solution will be identical with the properties of the cellulose ether before dissolution and precipitation.

In the light of these facts, it becomes manifest that the present invention rests on a perfectly novel and surprising discovery namely the discovery that those alkali-soluble cellulose ethers which contain less than one alcohol radical or hydroxy-acid residue introduced into the cellulose molecule per one $C_6H_{10}O_5$-molecular unit of cellulose, particularly, however, not more than one introduced alcohol radical or hydroxy-acid residue per 2 or 3 or 4 or more $C_6H_{10}O_5$-molecular units of cellulose and which will not dissolve or will only incompletely dissolve in caustic alkali solution at room temperature, or at a temperature not substantially lower than room temperature can be converted into cellulose ethers which will readily and completely or at least practically completely dissolve in caustic alkali solution at room temperature or at a temperature not substantially lower than room temperature; by precipitating their complete or practically complete solutions obtained with the aid of the refrigeration method.

All the more is the present invention surprising, since it uses for the precipitation, coagulants which have never (prior to the inventions of this inventor) been used for the bulk precipitation of solutions of alkali-soluble cellulose ethers of any kind, cellulose ethers which will dissolve in caustic alkali solutions at room temperature included, with a view to the production of cellulose ethers to be used as initial materials for the manufacture of shaped structures or other useful articles therefrom.

(3) Heretofore, only filtered solutions prepared at room temperature of alkali-soluble cellulose ethers which will not completely dissolve in caustic alkali solution at room temperature were precipitated, with the purpose of dissolving the precipitates and using the solutions thus obtained for the production of shaped structures. This method was however practised neither with the object of preparing cellulose ethers which would dissolve in caustic alkali solutions at room temperature or at a temperature not substantially lower than room temperature nor with the object of producing alkali soluble cellulose ethers having especially favourable properties, i. e. yielding shaped structures distinguished by excellent qualities.

The object of the said method was solely and only to free the cellulose ethers from their constituents which would not dissolve in caustic alkali solution at room temperature-constituents which, in many cases were present in the said ethers in large amounts, for example in proportions of 40 and even 90 per cent. of the part which would not directly dissolve to 60 to 10 per cent. of the part which would dissolve.

Consequently, that method is merely a method for purifying the cellulose ethers in question.

Now, since the cellulose ethers present in the filtered solutions prepared at room temperature of these cellulose ethers will dissolve in caustic alkali solution at room temperature, the object of applying the aforementioned method to those cellulose ethers is neither to render them capable of dissolving in caustic alkali solution at room temperature, nor to prepare cellulose ethers having particularly favourable properties, i. e. the capability of yielding shaped structures of high-grade qualities.

On the contrary: It is well known in the art that, owing to the very low concentration of the solutions so precipitated (in this method cellulose ether solutions containing only 0.8 to 1.6 per cent. of cellulose ether are used) the cellulose molecule contained in the cellulose ether undergoes degradation; so much so, that the so purified ethers yield in general shaped structures having more or less inferior properties inferior even to the properties of shaped structures prepared from such cellulose ethers as in their original condition will completely dissolve in caustic alkali solution at room temperature.

But this difference in quality is nothing in comparison with the difference between the shaped structures produced from cellulose ethers purified by the aforementioned method on the one hand and the shaped structures made from cellulose ethers prepared according to the present invention on the other, the properties of the latter being infinitely superior to the properties of the former.

Now, the present invention shows that the reason for this tremendous difference is that, whereas in the purifying method discussed above the constituents which do not dissolve at room temperature are removed from the ethers by filtering their solutions before precipitation, in the present process, these most valuable parts of the ethers are present in the solutions in the dissolved state and then precipitated in an improved condition together with that part, if any, which from the outset was capable of dissolving in caustic alkali solution at a temperature higher than the temperature used for the dissolution of the initial cellulose ether.

It is therefore obvious that, face to face with all what is known in the art about the precipitation of solutions of alkali soluble cellulose ethers, the present invention as such and its technical effects are most surprising.

In addition, the present invention is different from the method commented upon above by the precipitant used. For, whilst in the method commented upon above an acid or another substance capable of neutralising the caustic alkali contained in the cellulose ether solution is used as precipitant, the precipitants characteristic of the present invention are water or one or more alkali carbonates or carbon dioxide or carbonic acid respectively, which do not neutralize caustic soda.

As stated above, the present invention comprises:

(1) Dissolving in caustic alkali solution at a temperature capable of yielding a complete or practically complete solution of the desired strength, A cellulose ether which will not dissolve or will only in part dissolve in caustic alkali solution at room temperature or at a temperature not substantially lower than room temperature and which yields solutions sufficiently concentrated to be suitable for the preparation of shaped structures and other useful articles only if it is dissolved by cooling its suspension or incomplete solution in caustic alkali solution down to a temperature at which freezing or formation of crystals occurs, or A cellulose ether which will not dissolve or will only in part dissolve in caustic alkali solution at room temperature or at a temperature not substantially lower than room temperature and which yields solutions sufficiently concentrated to be suitable for the production of shaped structures and other useful articles only if it is dissolved at a temperature substantially lower than room temperature, and (2) Precipitating the thus obtained solution with a precipitant selection from the group consisting of water, alkali carbonates, carbon dioxide or carbonic acid respectively.

To realize the intent and purpose inherent in the present invention, the precipitate thus obtained is, optionally after having been washed or washed and dried, dissolved in caustic alkali solution preferably at or near room temperature, and the solution thus obtained used for the preparation of a shaped structure or any other useful article, by coagulation.

In most cases, such cellulose ethers as will not wholly dissolve in caustic alkali solution at room temperature or at a temperature not substantially lower than room temperature, i. e. the initial materials of the present process, contain less than one alcohol radical (which may be a hydroxy-acid residue) introduced into the cellulose molecule per about one $C_6H_{10}O_5$-molecule of cellulose, and preferably not more than one introduced alcohol radical per about 2 $C_6H_{10}O_5$-molecular units of cellulose.

From the previous research-work it is further known that those alkali-soluble cellulose ethers which contain not more than one alcohol radical linked ether-fashion with the cellulose molecule per about 3 or 4 or 5 $C_6H_{10}O_5$-molecular units of cellulose or even per about 6 to 15 $C_6H_{10}O_5$-molecular units of cellulose, yield especially valuable shaped structures (shaped structures having pre-eminent properties).

This fact can be seen from many examples of U. S. patents numbered 1,683,831, 2,265,914, 2,265,915, 2,327,911 and 2,327,912 and British Patent No. 177,810 in which proportions of one mol. of alkylating agent are used per about 2 to 15.5 $C_6H_{10}O_5$-molecular units of cellulose for the preparation of alkali-soluble alkyl ethers of cellulose, or from Patent Nos. 1,722,927 and 1,857,097 in which proportions of one mol. of hydroxy-alkylating agent is used per about 2 to 7 $C_6H_{10}O_5$-molecular units of cellulose for the preparation of alkali-souble hydroxy-alkyl ethers of cellulose, or from Patent No. 1,682,292 in which proportions of about one mol. of monohalogen fatty acid is used per about 1.2 to 5.5 $C_6H_{10}O_5$-molecular units of cellulose for the preparation of hydroxy-acid ethers of cellulose.

Consequently, the present invention can also be defined as follows:

The present invention comprises:

(1) Dissolving in caustic alkali solution a cellulose ether which contains less than one alcohol radical (which may be a hydroxy-acid residue) introduced into the cellulose molecule per about one $C_6H_{10}O_5$-molecular units of cellulose, and preferably not more than one introduced alcohol radical or hydroxy-acid residue per 2 or 3 or 4 or 5 or 10 or 15 or 30 or more $C_6H_{10}O_5$-molecular units of cellulose, at a temperature which yields the most complete solution obtainable with the relative cellulose ether, and (2) Precipitating the thus obtained solution with a precipitant selected from the group consisting of water, alkali carbonates, carbon dioxide and carbonic acid respectively.

Needless to say, also this definition of the invention implies the dissolving in caustic alkali solution of the optionally washed or washed and dried precipitate in caustic alkali solution and using the so obtained solution of the said precipitate for the manufacture of shaped structures or other useful articles.

Although, at bottom, the carrying out of the present process in practice is comparatively simple, the working conditions may be varied within wide limits, without departing from the spirit of the invention. It is therefore not intended to limit the invention to the following description and to the examples illustrating the practical execution of the process; for example to the particulars given therein as to the types of the initial alkali-soluble cellulose ethers (i. e. as to the nature of the alcohol radical or alcohol radicals introduced ether-fashion into the cellulose molecule and as to the representatives set forth by way of examples for the various types of the various initial cellulose ethers and as to the processes and methods for the production of the initial cellulose ethers), as to the concentration of the solutions of the initial cellulose ethers to be precipitated, as to the temperature or temperatures at which the solutions are prepared, as to the amount or amounts of precipitants used, as to the details of the treatment according to the present process, as to the processes or methods and temperatures of the preparation of the solutions of the cellulose ethers prepared according to the present invention and as to the quantitative composition of these solutions, as to the substances which optionally may be added to these solutions, as to the methods of working up these solutions into shaped structures or other useful articles, as to the methods of converting the cellulose ethers prepared according to the present invention into their xanthates, as to the methods for working up the cellulose ether xanthates prepared according to the present invention into shaped structures, as to the after-treatment of the shaped structures or other useful articles according to the present invention, etc. etc.

It is to be understood that in the present invention cellulose ethers may be used as initial materials which are made by any process or method whatever allowing of the production of cellulose ethers of the aforementioned types. For instance, if the working conditions are suitable for the preparation of such cellulose ethers as have the solubility relationships set forth above, any one of the processes and/or methods described in Patent Nos. 1,589,606, 1,683,831, 1,683,682, 1,722,927, 1,682,292, 1,682,294, 2,095,524, 2,327,911, 2,327,912, 2,265,917, 2,265,918 and 2,306,451 and British Specification No. 462,456 or in U. S. applications Ser. No. 71,254, now abandoned, Ser. No. 91,790 now abandoned or any other process or method which may be used for the preparation of cellulose ethers of the aforementioned types, may be used for the production of the cellulose ethers used as initial materials in the present invention.

In other words: Not only such alkali-soluble cellulose ethers of the aforementioned types as can be prepared by the processes and methods described in the specifications set forth in the foregoing paragraph, but also such alkali-soluble cellulose ethers of the aforementioned types may be used as initial materials in the present invention can be prepared by any other process or method suitable for the preparation of cellulose ethers of the aforementioned types.

It is further to be understood that, in the present invention either simple or mixed alkali-soluble cellulose ethers can be employed. As mixed ethers the following may be named by way of example:

Cellulose ethers containing in their molecule two different alkyl groups, cellulose ethers containing in their molecule an alkyl group and a hydroxy-alkyl group, cellulose ethers containing in their molecule two different hydroxy-alkyl groups, cellulose ethers containing in their molecule an alkyl group and a hydroxy-alkyl group, cellulose ethers containing in their molecule two different hydroxy-acid residues, cellulose ethers containing in their molecule an alkyl group and a hydroxy-acid residue, cellulose ethers containing in their molecule a hydroxy-alkyl group and a hydroxy-acid residue and so on.

These mixed ethers can be obtained, for example, by treating under conditions adapted for the preparation of such cellulose ethers as have the solubility relationships set forth above simultaneously or in either order with two different alkylating agents, or with an alkylating agent and a hydroxy-alkylating agent, or with two different hydroxy-alkylating agents, or with two different halogen fatty acids, or with an alkylating agent and a halogen fatty acid, or with a hydroxy-alkylating agent and a halogen fatty acid, etc. etc. In case of simultaneous treatment, the two different reagents may be added to the alkali cellulose together, for example mixed, or one after the other in either order.

The carrying out of the present invention in practice comprises the following steps:

(1) Dissolving in caustic alkali solution at a temperature capable of yielding a complete or practically complete solution of the desired strength, A cellulose ether which will not wholly dissolve in caustic alkali solution at room temperature or at a temperature not substantially lower than room temperature and which yields solutions sufficiently concentrated to be suitable for the preparation of shaped structures and other useful articles only if it is dissolved by cooling its suspension or incomplete solution in caustic alkali solution to a temperature at which freezing or formation of crystals occurs, or A cellulose ether which will not wholly dissolve in caustic alkali solution at room temperature or at a temperature not substantially lower than room temperature and which yields solutions sufficiently concentrated to be suitable for the production of shaped structures and other useful articles only if it is dissolved at a temperature substantially lower than room temperature, (2) Precipitating the thus obtained solution with a precipitant selected from the group consisting of water, alkali carbonates, carbon dioxide or carbonic acid respectively, (3) Dissolving in caustic alkali solution the cellulose ether prepared by the process consisting of the steps set forth above under (1) and (2), and (4) Working up the solutions of the final cellulose ether into a shaped structure or any other useful article.

Concerning (1): Since, to obtain the full effect or effects of the present invention, it is important to start from solutions containing the whole or practically whole substance of the initial cellulose ether in the dissolved state, it is advisable to conduct the dissolution of the initial cellulose ether at a temperature at which a complete or almost complete solution of the desired concentration of the cellulose ether in hand is produced.

In most cases, the upper limit of this temperature varies with the proportion of the cellulose ether desired in the solution.

For example: Some representatives of the cellulose ethers of the aforementioned types will dissolve with the formation of complete or almost complete solutions of any strength only when their suspensions or incomplete solutions in caustic alkali solution are cooled to a temperature at which freezing or formation of crystals occurs.

Other cellulose ethers of the abovementioned types will dissolve with the formation of complete or almost complete solutions containing a considerable proportion (for example 6 to 9 per cent.) of cellulose ether only by freezing, but will dissolve with the formation of complete or almost complete solutions containing a moderate proportion, for example 4 to 5 per cent. of cellulose ether by cooling their suspensions or incomplete solutions in caustic alkali solution to a temperature at which no freezing or formation of crystals occurs, for example to minus 2 or to 0° C. or to a temperature between 0° C. and plus 5° C., and will dissolve with the formation of complete solutions or almost complete solutions containing a small proportion, for example 2 per cent. of cellulose ether at room temperature.

Other cellulose ethers of the aforementioned types will dissolve with the formation of complete or almost complete solutions containing a considerable proportion, for example 6 to 9 per cent. of cellulose ether when their suspensions or incomplete solutions in caustic alkali solution are cooled to a temperature at which no freezing or formation of crystals occurs, for example to minus 4° or minus 2° C. or 0° C., and will yield moderately concentrated solutions, for example solutions containing 4 to 5 per cent. of cellulose ether at somewhat higher temperatures, for example at a temperature between 0° C. and plus 5° C. and will dissolve with the formation of complete solutions or almost complete solutions containing a small proportion, for example 2 per cent. of cellulose ether at room temperature.

As a matter of course, the temperatures set forth above are mentioned by way of example and it is to be understood that they are to be regarded as the upper limits of those temperatures which are necessary to obtain complete or almost complete solutions of the cellulose ethers in question.

In other words: Complete or almost complete solutions will also be obtained when lower temperatures as set forth above are used in the dissolving step.

The upper limit of the temperature at which the dissolving step is to be conducted further depends on the strength of the caustic alkali solution used.

In this respect it must be understood that with caustic alkali solutions of lower concentrations recourse must be taken to freezing also in such cases in which a moderate proportion, and at any rate to lower temperatures than the temperatures mentioned above also in such cases in which a small proportion of the cellulose ether is desired to be present in the solutions intended for precipitation according to the present process.

The cellulose ethers used as initial materials in the present invention may be dissolved either in the form of the crude products resultant from the etherifying operation or they may be first isolated therefrom, for example by washing the crude reaction masses resulting from the etherifying step, which washing may or may not be preceded or followed by acidification. If the acidification follows the washing operation, it is recommendable to free the washed and acidified ethers from acid by washing them again after the acidification.

The initial cellulose ethers may be in the wet or moist or in the dry state, prior to mixing with the caustic alkali solution.

Concerning (2): The temperature of the precipitants may be varied within wide limits. Thus, for instance, they may be kept at room temperature or at a temperature below room temperature or above room temperature or at a raised temperature. In many cases, the precipitation occurs quicker and more complete and the amount of the precipitants necessary for thorough precipitation is smaller when the precipitants are used at a raised temperature.

If water is used as precipitant, it is employed in the form of pure, i. e. distilled water or in the form of any water of ordinary purity occurring in nature. If desired or expedient, in both cases, small proportions of organic or inorganic substances may be added to the water to be used as precipitating agent.

The alkali carbonates may be used in the solid state or in the form of their solutions. In the latter case, the solutions may be either dilute solutions or solutions of moderate strength or concentrated or saturated or supersaturated solutions.

If desired or expedient, other alkaline and also neutral salts may be added to the alkali carbonate solutions.

The carbon dioxide may be used in any available form, i. e. in the form of carbon dioxide produced by any process or method known in the technology of carbon dioxide or in the form in which it occurs in nature or in the form of those by-products or waste-products which contain carbon dioxide, for example in the form of flue gas or lime kiln gas or in the form in which it is evolved in some fermentation processes. It may be used in the undiluted state or diluted with other gases, or in the form of a medium containing carbon dioxide. It may be further used in the form of a dispersion or solution in water.

It is advisable to conduct the precipitation with stirring or otherwise agitating and in cases in which small quantities by volume of the liquid precipitants or in which precipitants in the solid form are used, even with energetic kneading in a kneading machine whose blades may or may not be dentated.

The precipitated masses can be further worked immediately or soon after their precipitation is completed or, before being worked, they may be heated or warmed or remain for a shorter or longer time (for instance 1 hour to 6 hours or longer) at room temperature.

Before being dissolved, the precipitated cellulose ethers may be washed or washed and thereafter dried. In many cases, however, particularly when water is used as precipitant, they may be dissolved in the unwashed state. In the latter case, they should be separated from the mother liquor by straining, filtering, centrifuging or the like.

Concerning (3): The dissolution in caustic alkali solution of the ethers prepared according to the present invention by the precipitation of the solutions of the initial cellulose ethers can be carried out by any method known in the art. Since the cellulose ethers prepared according to the present invention will dissolve in caustic alkali solution at room temperature or at a temperature not substantially lower than room temperature with the formation of complete or practically complete solutions having concentrations suitable for the production of shaped structures, the dissolving may be conducted in most cases at or only slightly below room temperature.

If so desired, for some reason or another, the dissolution may be conducted at a temperature below room temperature or even below 0° C.

Concerning (4): The working up of the cellulose ether prepared according to the present invention into shaped structures, for example artificial threads, film, coatings of any kind and the like, is effected, for example, by bringing a solution of a cellulose ether prepared in accordance with the invention, into the desired shape and acting upon the thus shaped solution with a coagulating agent, for example one of the coagulating baths known in the art of making shaped structures from alkali-soluble cellulose ethers and/or viscose.

The cellulose ethers prepared according to the present invention may be worked up into shaped structures also in such a manner that their shaped solutions are contacted with an agent or agents which has or have a coagulating effect on the shaped solution and a plasticizing effect on the freshly coagulated material. As agents which exert a coagulating and plasticizing action, baths containing at least 25 per cent. strength of sulphuric acid monohydrate (for example 25 to about 70 per cent. of sulphuric acid monohydrate), or such proportion of another strong mineral acid as will produce an effect in the manufacture of shaped structures similar to that given by sulphuric acid containing at least 25 per cent. of $H_2SO_4$, have proved suitable. The coagulating and plasticizing of the solution may also occur in two steps by acting upon the shaped solution first with one or more agents which have a coagulating but no or only little plasticizing effect on the shaped solution and then with one or more agents (for example strong mineral acids, particularly strong sulphuric acid) which have a plasticizing effect on the freshly coagulated material.

As far as supportless shaped structures, such as artificial threads, artificial hair, artificial straw, film, bands, strips or the like are concerned, the shaping and coagulating may be effected by extruding the cellulose ether solution through suitably formed openings into a coagulating bath. Supportless shaped structures such as film or strips or the like may be also produced according to the invention by spreading the cellulose ether solution on a smooth surface on which it is at least partly immersed in the coagulating bath and thereafter removing the coagulated shaped structure from the said surface and finishing the shaped structure in the usual manner. In case of such shaped structures as are combined with a rigid or pliable support, such as coatings, layers and impregnations of any kind, dressings of fabrics, textile printing, book-cloth, tracing-cloth, sizing of yarn, paper-sizing, paper-like surfacing etc. the shaping and coagulating may be accomplished by wholly or partially coating, impregnating, printing or otherwise covering or imbuing with the cellulose ether solution a rigid or pliable support and, with or without intermediate drying, treating the material with a coagulating bath, by either introducing the material into the coagulating bath or by spraying the coagulating bath on the material or conducting the material through a mist of the coagulating bath or by any other method of applying a liquid paste to a rigid or pliable support.

In Patent Nos. 1,722,928, 1,682,293, 2,327,911, 2,327,912, 2,265,917, 2,306,451, and 2,265,918, 2,231,927, 2,265,916 and 2,224,874 and U. S. applications Ser. Nos. 71,254 now abandoned, and 91,790 now abandoned, British Specification No. 462,456 and British Specification No. 28.808/36 processes or methods of working up solutions of alkali-soluble cellulose ethers into shaped structures are described and illustrated by examples so thoroughly that, instead of repeating the working formulae, it suffices to refer to the said specifications which will serve as useful description of examples for the conversion of the alkali-soluble cellulose ethers prepared according to the present invention into shaped structures or other useful articles.

It must be pointed out expressly that the working up of the cellulose ethers prepared according to the present invention into shaped structures may also be effected according to the process described in U. S. Patent 2,265,916, i. e. by coagulating a shaped solution containing at least one cellulose ether produced according to the present invention by a medium containing at least one alkali carbonate or according to the process described in U. S. Patent 2,231,927 in which water is used as coagulant for shaped solutions of alkali-soluble cellulose ethers.

Any suitable softening agent, such as glycerine or a glycol or a sugar, such as glucose or a soap, or Turkey-red oil, or a drying or non-drying oil, or a halogen derivative of a di- or poly-valent alcohol, particularly a halohydrin, such as a dichlorhydrin or a monochlorhydrin or ethylene chlorhydrin, in short, insofar as it is compatible with the alkali-soluble cellulose ethers, any substance known in the viscose art as addition to viscose may be added to the solutions of cellulose ethers prior to their conversion into shaped structures according to the present invention.

Useful parent materials for the production of shaped structures are obtained when the cellulose ethers prepared according to the present invention are xanthated, for example according to the processes described in Patent Nos. 2,021,861, 1,858,097, 1,910,440 and 2,265,914.

The xanthates of the cellulose ethers prepared according to the present invention can be produced by acting on the cellulose ethers with carbon bisulphide in presence of alkali. The carbon bisulphide may be caused to act either upon the cellulose ethers in the solid form in presence of caustic alkali solution, for example upon a moist alkali compound of a cellulose ether or upon a mixture of a cellulose ether with caustic alkali solution or upon a suspension of a cellulose ether in caustic alkali solution or upon a solution of a cellulose ether in caustic alkali solution.

The methods of producing xanthates of cellulose ethers and the working up of such xanthates into shaped structures in the four aforesaid specifications as well as in U. S. Patents 2,265,917, 2,265,918 and 2,306,451 and British specifications 459,122 and 462,456, described and illustrated by examples in so exhaustive a manner that it is sufficient to refer to the respective parts of the said specifications which will serve as useful descriptions of, and examples for, the conversion into their xanthates of the alkali-soluble cellulose ethers prepared according to the present invention and the working up of the thus obtained xanthates into shaped structures.

It must be pointed out expressly that the working up of the xanthates of the cellulose ethers prepared according to the present invention into shaped structures or other useful articles may also be effected according to the processes described in British Patents 472,888 and 472,933 namely by the use of alkali monocarbonate or bicarbonate solutions as coagulating baths.

Any suitable softening agents, such as glycerine or a glycol or a sugar, such as glucose or a soap or Turkey-red oil, or a drying or non-drying oil, or a halogen derivative of a di- or polyvalent alcohol, particularly a halohydrin, such as a dichlorohydrin or a monochlorohydrin or ethylene chlorohydrin may be added to the solutions of the xanthates of the cellulose ethers produced according to the present invention.

With regard to the practical carrying out of the present invention in practice, it is impossible to indicate every condition for success in every particular case and it is to be understood that preliminary experiments cannot be avoided to find what the conditions necessary for success when using a particular kind of cellulose, a particular initial cellulose ether, a particular method for the production of the initial cellulose ether and so on.

In order to explain the nature of the present invention, the following specific examples are set forth. It is to be understood that the invention is not limited to these examples, to the precise proportions of ingredients, the times and temperature and sequence of steps set forth; the parts are by weight:

Example I A to N

A. 1000 parts of air-dry wood-pulp of a quality and viscosity customary in the viscose art or cotton linters of similar quality are steeped in 10,000 to 20,000 parts of caustic soda solution of 18 per cent. strength at 15° C. and the mixture allowed to stand at 10° C. for 1 to 24 hours. The resulting mass is then pressed at 15 to 18° C. to 3000 to 3500 parts and comminuted at 10° C. for 1 to 3 hours in a Werner-Pfleiderer shredder or another suitable comminuting machine or in a Werner-Pfleiderer xanthating machine whose blades may be dentated, after which the shredded alkali cellulose is allowed to mature for 72 hours at 10° C. Thereupon 200 parts of ethylene chlorohydrin or 110 parts of ethylene oxide are added in one or several portions and the reaction mass is shredded for about 3 hours at 10° C.

The crude reaction mass is, without being washed or otherwise treated, mixed with such quantity of a caustic soda solution of approximate strength as to yield a solution or suspension containing about 6 per cent. of the cellulose ether in 8 to 9 per cent. of caustic soda solution and kept at room temperature with continuous or intermittent stirring for 1 hour. Thereafter the thus obtained mixture is cooled down with stirring to minus 10° C. and kept at this temperature with stirring for 20 minutes. After that time the frozen mass is allowed to come back to room temperature.

The solution thus obtained is a viscose solution which to the eye is perfectly free from undissolved constituents or fibres.

Although, in such circumstances, filtration is unnecessary, to secure perfect freedom from dust or any other impurities which might during or after the reaction have accidentally gotten into the reaction mixture or solution, the solution is filtered by way of precaution through medicated cotton wool. It filters only at a pressure of 8 to 10 atmospheres and also this rather slowly and with repeated change of the cotton wool.

The viscosity of the filtered solution is about 18 to 20 as compared with glycerine of 1.26 specific gravity.

A film of 0.02 mm. thickness produced from this solution by coagulation with a solution containing in 1000 parts by volume 160 parts of $H_2SO_4$ and 320 parts of $Na_2SO_4$ has a dry tenacity of about 20,500 lbs. per square inch and a wet tenacity of about 4500 lbs. per square inch.

The filtered solution is with continuous stirring precipitated with eight times its weight of water of 95 to 100° C. and then kept at 75 to 80° C. for 15 minutes.

The precipitate thus obtained is separated from the mother liquor on a straining cloth or in a filter press or in a centrifuge and then washed with hot water and thereafter wtih cold water until free from alkali, and pressed.

The washed and pressed cellulose ether can be dissolved either in the moist state or after having been dried, if desired, after dehydration with alcohol and, if desired, after exhaustion with ether.

If the moist cellulose ether is to be dissolved without drying it is necessary to determine its water content, for example by drying a weighed portion at 105° C. to constant weight.

For dissolving the moist celluose ether it is intimately mixed at 15 to 18° C. with so much caustic soda solution of appropriate strength as to yield a mixture containing 7 per cent. of the hydroxy-ethyl cellulose and 93 per cent. of caustic soda solution of 8 to 9 per cent. strength.

If it is desired to dry the ether before its dissolution, to obtain a solution of same concentration, the dry ether is mixed direct with an 8 to 9 per cent. caustic soda solution at 15 to 18° C. in a proportion of 7 parts of the dry ether to 93 parts of caustic soda solution.

In both cases, the dissolving which is conducted with continuous stirring proceeds smoothly and results in a solution which is free or practically free from undissolved constituents.

It is then filtered. It filters excellently well at a pressure of 2 to 3 atmospheres and has a viscosity of about 38.8 as compared with glycerine of 1.26 specific gravity. (In a 6 per cent. solution, the final cellulose ether has a viscosity of about 19 to 20 as compared with glycerine of 1.26 specific gravity.)

After being freed from gas bubbles in the usual manner, the filtered solution is, according to the methods set forth above, worked up into shaped structures, such as artificial threads, for example artificial silk or staple fibre, artificial hair, artificial straw, film of every kind, bands and plates of every kind, plastic masses of any description, adhesives and cements, finishes, coatings and layers of every kind, particularly such as are applicable in finishing, filling and dressing of textile fabrics, sizing of yarn, or used as thickening agent or fixing agent for a pigment in textile printing and the like, or as paper-like surfacing or paper-sizing, or in the manufacture of artificial leather or of book-cloth or of tracing cloth or of transparent paper or of transparent cloth and the like.

A film of 0.02 mm. thickness produced from this solution at room temperature has a dry tenacity of about 21,800 lbs. per square inch and a wet tenacity of about 5700 lbs. per square inch.

NOTE.—The original ether, dissolved under refrigeration thus gives a film showing a dry tenacity of 20,500 lbs. per sq. inch, and a wet tenacity of 4500 lbs. per sq. inch. The treated ether gives a similar film showing a dry tenacity of 21,800 lbs. per sq. inch and a wet tenacity of 5700 lbs. per sq. inch. It is not attempted to explain the reason for this tremendous increase in wet tenacity.

From this example it can be seen,

That, whereas, to produce a solution of 6 per cent. strength, the initial cellulose ether must be dissolved by the freezing method, the cellulose ether prepared therefrom according to the present example forms easily a solution of 7 per cent. strength on being dissolved at room temperature and, That, nevertheless, (a) The viscosity of the solution of the cellulose ether prepared according to the present example is equal to the viscosity of a solution of the initial cellulose ether of same strength, (b) A 7 per cent. solution of the cellulose ether prepared according to the present example filters more easily than a 6 per cent. solution of the initial cellulose ether of same strength, and (c) The shaped structures produced from the cellulose ether prepared according to the present example have at least as excellent properties as the shaped structures prepared from the solution of the initial cellulose ether.

B. The process is conducted as in A, but with the difference that the quantity of water used for the precipitation is only two times the weight of the solution of the initial cellulose ether.

With regard to its solubility, with regard to the viscosity and filterability of its solution and with regard to the shaped structures produced therefrom, the cellulose ether prepared according to B is similar to the cellulose ether prepared according to A.

C. The process is conducted as in A, but with the exception that, before being dissolved and precipitated, the initial cellulose ether is isolated from the crude reaction product by the following method:

The crude reaction mass as such or after having been neutralised or acidified (for example, with sulphuric acid of 5 to 10 per cent. strength) is washed with water and then pressed and, after the water content of the pressed product has been determined, mixed direct with so much caustic soda solution of appropriate strength as to yield a mixture containing about 7 per cent. of the cellulose ether and 93 per cent. of a caustic soda solution of 8 to 9 per cent. strength and then frozen, thawed, filtered and worked up as described in A.

The 7 per cent. solution of the isolated initial cellulose ether prepared by the freezing method has a viscosity of about 38 as compared with glycerine of 1.26 specific gravity and filters slowly at a pressure of 8 to 10 atmospheres, whereas the 7 per cent. solution prepared at room temperature from the final cellulose ether, has a viscosity of about 32 as compared with glycerine of 1.26 specific gravity and filters very well at a pressure of 3 to 4 atmospheres.

A film of 0.02 mm. thickness produced from the 7 per cent. solution of the initial cellulose ether has a dry tenacity of about 19,000 lbs. per square inch and a wet tenacity or about 6,000 lbs. per square inch, and a film of same thickness produced in the same manner from the 7 per cent. solution of the final cellulose ether has a dry tenacity of about 20,000 lbs. per square inch and a wet tenacity of about 6,600 lbs. square inch.

Consequently, notwithstanding that it dissolves perfectly in caustic soda solution at room temperature, the cellulose ether prepared according to C is, with regard to its properties and the properties of the shaped structures produced therefrom, equal or similar to the initial cellulose ether which can be dissolved to a 7 per cent. solution only by the freezing method.

D. The process is conducted as in C, but with the difference that the quantity of water used for the precipitation is only two times the weight of the solution of the initial cellulose ether.

With regard to dissolving it in NaOH solution, with regard to the viscosity and filterability of its solution and with regard to the properties of the shaped structures produced therefrom, the cellulose ether prepared according to this example is similar to the cellulose ether prepared according to D.

E. The process is conducted as in any one of A to D, but with the difference that the cellulose ether precipitated from the solution of the initial cellulose ether is not washed, but only freed from the mother liquor by straining and/or pressing.

After the water and caustic soda contained in the cellulose ether separated from the mother liquor has been determined, the ether is dissolved at room temperature in so much caustic soda solution of appropriate strength as, together with the water and caustic soda adhering to the ether, to yield a 7 per cent. solution of the cellulose ether in caustic soda solution of 8 to 9 per cent. strength.

With regard to dissolving it in NaOH solution at room temperature, to the properties of its solution and to the properties of the shaped structures produced therefrom, the cellulose ether prepared according to E is similar to the cellulose ethers prepared in A to D.

F. Mode of procedure as in A to C, but with the difference that, instead of hot water, cold water (for instance at 12 to 20° C.) is used as precipitating agent, the quantity of the water being 20 times the weight of the solution of the initial cellulose ether.

G. The process is conducted as in any one of A to D, but with the exception that, instead of the hot water used therein, a sodium carbonate solution of 28 per cent. strength at 50 to 90° C. is used as precipitant.

With regard to dissolving it in NaOH solution at room temperature, to the properties of its solution and to the properties of the shaped structures produced therefrom, the cellulose ether prepared according to G is similar to the cellulose ethers prepared in A to D.

H. The process is conducted as in any one of A to D, but with the exception that, instead of the hot water used therein, a sodium carbonate solution of 20 per cent. strength at 20° C. is used as precipitating agent.

With regard to dissolving, to the properties of its solution and to the properties of the shaped structures produced therefrom, the cellulose ether prepared according to H is similar to the cellulose ethers prepared in A to D.

The sodium carbonate solution of 20 per cent. strength may be used also at a higher temperature, for example at 50 or 70° C. or at a still higher temperature with equal or similar effect.

J. The process is conducted as in any one of A to H, but with the exception that the solution of the initial cellulose ether is a solution of 5 per cent. of the cellulose ether in 8 to 9 per cent. caustic soda solution and has been prepared at 0° C.

Although the 5% solution of the initial cellulose ether is practically free from undissolved constituents, it filters slowly at a pressure of 8 to 10 atmospheres, whereas an equally complete solution of 7 per cent. strength of the final cellulose ether prepared at room temperature filters very easily at a pressure of 2 to 3 atmospheres, the viscosity of the solution of the initial ether being about 6 and the viscosity of the solution of the 7% solution of the final ether being about 32 as compared with glycerine of 1.26 specific gravity. (On account of its low strength, the solution of the initial cellulose ether is not comparable with the solution of the final cellulose ether with regard to viscosity.)

A film of 0.02 mm. thickness produced from the 7 per cent. solution of the final cellulose ether that has been prepared at room temperature has a dry tenacity of about 26,000 lbs. per square inch and a wet tenacity of about 6,600 lbs. per square inch.

K. The process is conducted as in any one of A to H, but with the variation that the solution of the initial cellulose ether is a 4 per cent. solution of the cellulose ether in 8 to 9 per cent. caustic soda solution and has been prepared at plus 5° C.

With regard to its dissolving, to the properties of its solution and to the properties of the shaped structures produced therefrom, the cellulose ether prepared according to K is similar to the cellulose ethers prepared in A to D.

L. The process is conducted as in any one of A to H, but with the difference that the solution of the initial cellulose ether is a 2 per cent. solution of the cellulose ether in 8 to 9 per cent. caustic soda solution and has been prepared at 15° C.

With regard to its solubility and to the properties of its solution, the cellulose ether prepared according to L is similar to the cellulose ethers prepared in A to D.

A film of 0.02 mm. thickness produced from a 7 per cent. solution of the final cellulose ether in 8 to 9 per cent. caustic soda solution prepared at room temperature has a dry tenacity of about 23,000 lbs. per square inch and a wet tenacity of about 5,800 lbs. per square inch.

M. The process is conducted as in any one of A to L but with the difference that, instead of water or sodium carbonate solution, the solution of the initial cellulose ether is precipitated with carbon dioxide which is introduced in the gaseous form into the solution.

After a short time thickening of the solution occurs, after which the ether precipitates in a gelatinous form.

The introduction of the carbon dioxide with stirring is continued for about 1 hour during which time the mother liquor starts separating.

Thereafter the mass is placed on a straining cloth and washed with water.

The washed precipitate is then pressed and, after its water content has been determined, dissolved (in this case, without washing) at room temperature in such a quantity of a caustic soda solution of appropriate strength as to yield a 7 per cent. solution of the final cellulose ether in caustic soda solution of 8 to 9 per cent. strength.

A complete solution free or practically free from undissolved constituents results, which filters very easily at a pressure of 2 to 3 atmospheres. The viscosity of the 7% solution of the final cellulose ether is about 31 as compared with glycerine of 1.26 specific gravity.

A film of 0.02 mm. thickness produced from this solution has a dry tenacity of about 20,000 lbs. per square inch and a wet tenacity of about 6,000 lbs. per square inch.

Before being precipitated with carbon dioxide, the solution of the initial cellulose ether may be diluted with water, for instance with 100 to 200 per cent. of water calculated on the weight of the solution.

N. The process is conducted as in any one of A to M, but with the difference that the washed precipitate is stirred with 2 to 3 times its weight of hydrochloric acid of 4 to 5 per cent. strength, allowed to stand therewith at room temperature for 3 hours, then collected on a straining cloth or in a filter press or in a centrifuge and then washed with water until free from acid.

Before being dissolved, the washed precipitate may be dried, if desired, after dehydration with alcohol, and, if desired, with subsequent exhaustion with ether.

The washed precipitate is in the moist or dry state dissolved in caustic alkali solution at room temperature to form a 7 per cent. solution of the cellulose ether in caustic soda solution of 8 to 9 per cent. strength.

With regard to dissolving, to the properties of their solutions and to the properties of the shaped structures produced therefrom, the cellulose ethers prepared according to N are similar to the cellulose ethers prepared in A to D.

Instead of in a 8 to 9 per cent. caustic soda solution, the cellulose ethers prepared according to any one of A to N may be dissolved at room temperature or at a lower temperature in more dilute caustic soda solution, for example in caustic soda solution of 5 or 6 or 7 per cent. strength.

*Examples II A to N*

The process is conducted as in any one of the Examples I A to N, but with the difference that the shredding and maturing of the alkali cellulose and the treatment of the alkali cellulose with the ethylene chlorohydrin or ethylene oxide are conducted at 15° C. (instead of 10° C.).

*Examples III A to N*

The process is conducted as in any one of the

Examples I A to N, but with the difference that the shredding and maturing of the alkali cellulose and the treatment of the alkali cellulose with the ethylene chlorohydrin or ethylene oxide are conducted at 18° C.

Examples IV A to N

The process is conducted as in any one of the Examples I A to N, but with the difference that the shredding and maturing of the alkali cellulose and the treatment of the alkali cellulose with the ethylene chlorohydrin or ethylene oxide are conducted at 21° C.

As a matter of course, in proportion to the higher temperatures of shredding, maturing and treating the alkali cellulose with the hydroxyethylating agent, the viscosities of the solutions of the initial and final cellulose ethers of Examples II A to N to IV A to N are lower than the viscosities of the solutions of equal strength prepared according to the Examples I A to N.

Notwithstanding this fact, the viscosities of the final cellulose ether solutions are equal or not considerably lower than the viscosities of the initial solutions, the filtering capacities of the former being in general superior to the filtering capacities of the latter. The properties of the shaped structures produced from the solutions of the final cellulose ethers are equal to, or not substantially different from, the properties of the shaped structures made from the solutions of the initial cellulose ethers.

Examples V A to N

The process is conducted as in any one of the Examples I A to N, but with the exception that, instead of 200 parts of ethylene chlorohydrin or 110 parts of ethylene oxide, 100 parts of ethylene chlorohydrin or 55 parts of ethylene oxide are used for the etherification of the alkali cellulose (i. e. only half as much of the etherifying agent) and that, instead of being dissolved to a 7 per cent. solution in caustic soda solution of 8 to 9 per cent. strength, the initial and the final cellulose ether are dissolved to a 6 per cent. solution of 8 to 9 per cent. strength, the solution of the initial cellulose ether being prepared with the aid of the freezing operation as described in Example I A and the solution of the final cellulose ether being prepared at 15 to 18° C. as described in same example.

The former solution is, before filtration, complete and thus practically free from undissolved constituents and the latter solution is equally complete and perfectly free from undissolved constituents. The solution of the initial cellulose ether filters very slowly at a pressure of about 10 atmospheres, whereas the solution of the final cellulose ethers filters very well at a pressure of about 3 to 4 atmospheres.

The dynamometric properties of the shaped structures produced from the shaped solutions of the final cellulose ethers are in many cases superior to the dynamometric properties of the shaped structures produced from the shaped solution of the initial cellulose ether. Thus, for instance, a film of 0.02 mm. thickness prepared from a 6 per cent. solution of the final cellulose ether in 8 to 9 per cent. caustic soda solution has a dry tenacity of about 22,600 lbs. per square inch and a wet tenacity of about 5200 lbs. per square inch, whereas a film of same thickness produced from a solution of same concentration of the initial cellulose ether has a dry tenacity of about 18,000 lbs. per square inch and a wet tenacity of about 4000 lbs. per square inch.

Examples VI A to N

The process is conducted as in any one of the Examples V A to N, but with the variation that, instead of at 10° C., the shredding and the maturing of the alkali cellulose and the reaction between the alkali cellulose and the ethylene chlorohydrin or ethylene oxide are conducted at 21° C.

Examples VII A to N

Mode of procedure as in any one of the Examples I A to N, but with the exception that the initial cellulose ether is prepared as follows:

1000 parts of air-dry wood-pulp of a quality and viscosity customary in the viscose art or cotton linters of similar quality are steeped in 10,000 to 20,000 parts of caustic soda solution of 18.5 per cent. strength at 15° C. and the mixture allowed to stand at 15° C. for 1 to 24 hours. The resulting mass is then pressed to 3000 parts and comminuted at 20° C. for 1 to 3 hours in a Werner-Pfleiderer shredder or another suitable comminuting machine or in a Werner-Pfleiderer xanthating machine whose blades may be dentated, whereupon 100 parts of ethylene chlorohydrin or 55 parts of ethylene oxide are added in one or several portions. The reaction mass is shredded for about 3 hours at 20° C. and then allowed to stand at 15 to 20° C. for 15 hours.

A further difference between this example and Examples I A to N is that, instead of being dissolved to a 7 per cent. solution in caustic soda solution of 8 to 9 per cent. strength, the initial and the final cellulose ethers are dissolved to 6 per cent. solutions in caustic soda solution of 8 to 9 per cent. strength.

Examples VIII A to N

The process is conducted as in Examples VII A to N, but with the variation that, instead of 100 parts of ethylene chlorohydrin or 55 parts of ethylene oxide, 70 parts of ethylene chlorohydrin or 35 parts of ethylene oxide are used in the etherifying step.

Although prepared at 15 to 18° C., the 6 per cent. solution of the final cellulose ether in 8 to 9 per cent. caustic soda solution filters easily at a pressure of 2 atmospheres, whereas a 5 per cent. solution of the initial cellulose ether in caustic soda solution of 9 per cent. strength cannot be filtered at all through cotton wool but must be filtered through a loose cotton fabric.

Consequently, a 3 per cent. solution of the initial cellulose ether in caustic soda solution of 9 per cent. strength prepared by the freezing method must be used as the initial cellulose ether solution.

Whereas, as stated above, the 5 per cent. solution of the initial cellulose ether was not filterable, the 6 per cent. solution of the final cellulose ether prepared at room temperature filters excellently at a pressure of 2 atmospheres.

The dynamometric properties of the shaped structures produced from the final cellulose ether are more or less equal to the dynamometric properties of the shaped structures prepared from the 5 per cent. solution of the initial cellulose ether filtered through cloth.

Examples IX A to N

The process is conducted as in Examples VII A to N or VIII A to N, but with the exception that, before being contacted with the hydroxyethylating agent, the alkali cellulose is matured for 24 or 48 or 64 hours at 20° C.

Examples X A to N

The process is conducted as in Examples VII A to N or VIII A to N or IX A to N, but with the difference that, after the second shredding, the reaction mass is allowed to stand for 24 or 48 or 64 hours at 15 to 20° C. instead of for 15 hours.

Examples XI A to N

The process is conducted as in any one of the Examples I A to N to X A to N, but with the exception that, instead of being pressed to 3000 to 3500 parts, the alkali cellulose is pressed to 2000 to 2500 parts.

Examples XII A to N

The process is conducted as in any one of the Examples I A to N, but with the difference that the initial celullose ether is prepared as follows: 1000 parts of air-dry wood-pulp of a quality and viscosity customary in the viscose art or cotton linters of similar quality are steeped in 10,000 to 20,000 parts of caustic soda solution of 18 per cent. strength and the mixture allowed to stand at room temperature for 1 to 24 hours. The resulting mass is then pressed to 2000 to 2500 parts and comminuted at 20° C. for 1 hour in a Werner-Pfleiderer shredder or another suitable comminuting machine or in a Werner-Pfleiderer xanthating machine whose blades may or may not be dentated, whereafter the shredded alkali cellulose is allowed to mature for 72 hours at 20° C. Thereupon 37 to 38 parts of ethylene chlorohydrin or 20 parts of ethylene oxide or 50 parts of glycerol alpha-monochlorohydrin or 26 to 30 parts of propylene oxide are added and the reaction mass is shredded for about 3 to 6 hours at 15 to 20° C.

In this example the solution of the initial cellulose ether and the solution of the final cellulose ether are 6 per cent. solutions in caustice soda solution of 8 to 9 percent. strength. The solution of the initial cellulose ether prepared by the freezing method filters exceedingly slowly and difficultly, whereas the solution of the final cellulose ether prepared at plus 10 to 18° C. filters easily at a pressure of 4 atmospheres.

The dynamometric properties of the shaped structures prepared from the solution of the final cellulose ether are not substantially different from the dynamometric properties of the shaped structures produced from the solution of the initial cellulose ether.

Examples XIII A to N

Mode of procedure as in Examples XII A to N, but with the difference that, instead of 37 to 38 parts of ethylene chlorohydrin or 20 parts of ethylene oxide or 50 parts of glycerol alpha-monochlorohydrin or 13 to 15 parts of propylene oxide, 20 parts of ethylene chlorohydrin or 10 parts of ethylene oxide or 25 to 30 parts of glycerol alpha-monochlorohydrin or 13 to 15 parts of propylene oxide are used in the etherifying step.

The properties of the initial cellulose ether and its solution and of the shaped structures produced therefrom are similar to the properties of the final cellulose ether and its solution and of the shaped structures produced therefrom.

Examples XIV A to N

The process is conducted as in Examples XII A to N or XIII A to N, but with the difference that, instead of at 20° C., the alkali cellulose is matured at 25° C.

Examples XV A to N

The process is conducted as in any one of the Examples XII A to N to XIV A to N, but with the variation that, instead of to 2000 to 2500 parts, the alkali cellulose is pressed to 3000 to 3400 parts.

Examples XVI A to N

The process is conducted as in any one of the Examples I A to N or II A to N or III A to N or IV A to N, but with the exception that, instead of 200 parts of ethylene chlorohydrin or 110 parts of ethylene oxide, 200 to 300 parts of di-methyl sulphate ormonochloroacetic acid (in the form of a concentrated aqueous solution of sodium monochloroacetate) or 150 to 280 parts of glycerol alpha-monochlorohydrin or 150 parts of propylene oxide are used in the etherifying step.

Examples XVII A to N

The process is conducted as in any one of the Examples XVI A to N, but with the difference that, instead of the proportions of etherifying agents used therein, 100 to 150 parts of di-methyl sulphate or monochloroacetic acid (in the form of a concentrated aqueous solution of sodium monochloroacetate) or 75 to 140 parts of glycerol alpha-monochlorohydrin or 75 parts of propylene oxide are used in the etherifying step.

Examples XVIII A to N

The process is conducted as in any one of the Examples XII A to N to XV A to N, but with the difference that, instead of the ethylene chlorohydrin or ethylene oxide used therein, 50 parts of di-methyl sulphate are used in the etherifying step.

Examples XIX A to N

The process is conducted as in any one of the Examples XVIII A to N, but with the difference that, instead of 50 parts, 30 to 40 parts of di-methyl sulphate are used in the etherifying step, the solution of the initial cellulose ether being a 3 per cent. solution in caustic soda solution of 8 to 9 per cent. strength.

Examples XX A to N

The process is conducted as in any one of the Examples I A to N to XIX A to N, but with the difference that, instead of the proportions of etherifying agents used therein, a mixture of 50 parts of ethylene chlorohydrin or of 70 parts of glycerol alpha-monochlorohydrin or of 30 to 40 parts of ethylene oxide or of 70 to 80 parts of propylene oxide and 100 parts of di-ethyl sulphate or di-methyl sulphate or 100 parts of monochloroacetic acid (in the form of sodium monochloroacetate), or a mixture of 50 to 100 parts of di-methyl sulphate and 100 parts of di-ethyl sulphate or 100 parts of monochloroacetic acid (for example in the form of sodium monochloroacetate), or a mixture of 50 to 100 parts of di-ethyl sulphate or of di-methyl sulphate and 100 parts of monochloroacetic acid (for example in the form of sodium monochloroacetate), is used in the preparation of the initial cellulose ether.

Examples XXI A to N

The process is conducted as in any one of the Examples XX A to N, but with the difference that, instead of the proportions of etherifying agents used therein, a mixture of 25 to 50 parts of ethylene chlorohydrin or of 30 to 60 parts of glycerol alpha-monochlorohydrin or of 20 to 30 parts of ethylene oxide and 50 parts of di-ethyl sulphate or di-methyl sulphate or 50 parts of monochloroacetic acid (in the form of sodium monochloroacetate), or a mixture of 25 to 50 parts of di-methyl sulphate and 50 parts of di-ethyl sulphate or monochloroacetic acid (in the form of sodium monochloroacetate) or a mixture of 25 to 50 parts of di-ethyl sulphate or di-methyl sulphate and 50 parts of monochloroacetic acid (in the form of sodium monochloroacetate) is used in the preparation of the initial cellulose ether.

*Examples XXII A to N*

The process is conducted as in any one of the preceding examples, but with the exception that the initial cellulose ether is prepared as follows:

A quantity of any one of the alkali celluloses used for the etherification in any one of the foregoing examples corresponding to 1000 parts of air-dry parent cellulose is placed in a rotating autoclave or an autoclave provided with a stirring device, whereupon 200 to 500 parts of pre-cooled ethyl chloride are added and the material is heated to 60 to 100° C. and kept at this temperature for 6 to 12 hours.

*Examples XXIII A to N*

Mode of procedure as in Examples XXII A to N, but with the variation that the parent cellulose ether is prepared by hydroxy-alkylating any one of the ethyl celluloses prepared according to any one of the Examples XXII A to N.

The NaOH content of the crude reaction mixture resulting from the ethylating operation is determined by analysis, whereupon, optionally after compensating the amount of NaOH used up in the ethylating reaction by supplying to the reaction mixture the equivalent or a larger quantity of NaOH in the form of powder or of a strong solution, for instance of 30 to 50 per cent. strength, the reaction mixture is treated with 50 to 150 parts of ethylene chlorohydrin or 70 to 210 parts of glycerol alpha-monochlorohydrin or with 25 to 75 parts of ethylene oxide or with 32 to 100 parts of propylene oxide as described in any one of the preceding relative examples for alkali cellulose.

In those of the foregoing examples in which the alkali cellulose is matured for a longer time than 48 hours, the time of maturing may be shortened down, for example to 48 or 24 hours and in all foregoing examples the maturing can be entirely dispensed with.

In the foregoing examples in which sodium carbonate solutions are used for the precipitation of the initial cellulose ether solutions, instead of the sodium carbonate solution, a solution containing 12 per cent. of sodium bicarbonate at 20 to 45° C. can be used.

In these examples, instead of the sodium carbonate or sodium bicarbonate solution used for the precipitation of the initial cellulose ether solution, also a stronger or weaker solution of an alkali carbonate or a solution containing an alkali carbonate and an alkali bicarbonate or a solution containing an alkali carbonate and a neutral salt or a solution containing an alkali carbonate and another salt having alkaline reaction or a solution containing an alkali carbonate and an organic substance or a solution containing a mixture of an alkali carbonate with two or more of the substances set forth above in this paragraph can be used as precipitants.

In the foregoing examples the primary or secondary sodium carbonates used as precipitants may be wholly or partially replaced by one or more alkali salts having alkaline reaction of other weak inorganic or organic acids, for example by sodium tetra borate (borax) or by dibasic or tribasic sodium phosphate or by an alkaline sodium silicate or by sodium acetate or by sodium sulphite or the like.

When a solution of one or more alkali carbonates is used for the precipitation of the solution of the initial cellulose ether, the alkali carbonate or carbonates contained in the mother liquor of the precipitate may be either separated from the caustic alkali contained therein by any known method and the caustic alkali used in the process as described above or the alkali carbonate or carbonates may be converted into the corresponding caustic alkali by the well known causticization method. In either case also the alkali carbonate or at least part of it is re-utilized in the process in a circuitous course: in the former as alkali carbonate, i.e. as precipitant, in the latter as caustic soda for the production of the initial cellulose ethers and/or for dissolving the initial and/or final cellulose ethers.

If desired, carbon dioxide may be introduced into the mother liquor and into the first washing waters in which case the caustic soda contained therein is converted into sodium carbonate, the result being that the mother liquor and at least the first washing waters can, after being reinforced by an additional quantity of the carbonate or carbonates, be used in the precipitating step and thus reintroduced into the process in a cyclic course.

When carbon dioxide is used as precipitant, the mother liquor and the washing water contain alkali carbonate. They may therefore be treated as indicated above.

Instead of being prepared by steeping the cellulose in excess of caustic alkali solution and removing the excess by pressing, in any one of the preceding examples the alkali cellulose may be prepared by mixing the cellulose in a suitable mixing apparatus, for example a shredder or a kneading machine or a mill or a disintegrator or an edge runner or the like with the amount of caustic soda solution corresponding with the quantity remaining in the alkali cellulose used in the relative examples after pressing (for example with 2000 to 2500 parts of caustic soda solution of 18 per cent. strength). The mixing of the cellulose with the caustic alkali solution may be conducted at room temperature or at a temperature above room temperature, for example at 24 to 30°C., or with cooling, for example, to 15° or 10° C., or lower. The time of mixing may be varied within wide limits, for example from 1 hour to 24 hours or longer.

As a guiding line with regard to the question whether or not the alkali cellulose should be allowed to mature before being brought together with the etherifying agent or agents, may, among others, serve the desired viscosity of the final solution of the products of the invention, i. e. of the solution which is to be worked up into shaped structures, and in connection therewith the viscosity of the kind of cellulose used as starting material for making the initial cellulose ether. If it is desired to give the solution a definite viscosity, then the alkali cellulose produced from the kind of cellulose used is subjected to a maturing process, if without maturing this kind of cellulose yields a higher viscosity. If, however (in a preliminary experiment), the solution exhibits from the first the desired grade of viscosity, that is without maturing, the maturing is superfluous. Now, as the viscosities of the different kinds of cellulose on the market (linters and wood-pulp) differ very much from one another, the question of maturing depends in most cases on the one hand on the viscosity desired of the solution of the final ether intended for the manufacture of shaped structures, and on the other hand on the viscosity of the kind of cellulose used as starting material.

In the foregoing examples, any excess of any volatile etherifying agents which has not been used up in the etherifying reaction may be recovered by condensation or distillation.

In the foregoing examples, instead of cellulose, a conversion product of cellulose—for instance, a cellulose hydrate or a hydro-cellulose produced by chemical action on cellulose, such as merceristion with subsequent washing and, if desired, drying: or by treating with a strong inorganic or organic acid or a mixture of both; or by treating with a dilute solution of a mineral acid; or by treatment with a zinc halide; or by a mechanical process, such as grinding in presence of water or the like; or any oxy-cellulose—in short any body of the cellulose group which has been proposed for the manufacture of viscose or of any other cellulose derivatives or compounds or of ammoniacal-copper-oxide cellulose can be used as starting material for the production of the initial cellulose ether.

Consequently, the term "cellulose" used in the description and claims is, wherever the context permits, intended to include cellulose, its conversion and oxidation products, such as cellulose hydrate, hydrocellulose, acid-cellulose and the like, in short, any body of the cellulose group which has been proposed as starting material for the preparation of cellulose derivatives or cellulose compounds of any kind.

If feasible or expedient, in the foregoing examples, instead of the chlorinated etherifying agents used therein, equivalent quantities of the corresponding brominated or iodinated reagents (for example alkyl bromides or alkyl iodides or monobromohydrin or monoiodohydrin or ethylene bromohydrin or ethylene iodohydrin or bromo-acetic acid or iodo-acetic acid etc.) may be used.

If feasible or expedient, in the foregoing examples, instead of the alkylating or hydroxy-alkylating agents used therein, equivalent quantities of alkylating or hydroxy-alkylating agents containing other alkyl or hydroxy-alkyl groups can be used, for instance methyl chloride or propyl chloride or an amyl chloride or a butyl chloride or butylene chlorohydrin.

If feasible or expedient, instead of ethylene oxide or propylene oxide, other alkylene oxides, such as butylene oxide or glycide, in short all suitable compounds which contain an ethylene oxide ring can be used in the foregoing examples.

If feasible or expedient, instead of alkyl halides or di-alkyl sulphates, equimolecular amounts of their substitution or addition derivatives, for example halogen alkyl amines, such as halogen-alkyl-dialkyl amines or their hydro-chlorides can be employed in the foregoing examples.

If feasible or expedient, in the foregoing relative examples, instead of the choloracetic acid, the equimolecular quantity of an ester of chloro-acetic acid, for example methyl or ethyl-chloroacetate or a halogen derivative of a homologue of acetic acid, for instance alpha-chloropropi-onic acid or alpha-chloro-isobutyric acid or alpha-bromo-propionic acid or alpha-bromo-isobutyric acid or the like or an alkali salt or an ester thereof may be employed.

As stated above, the solutions of the cellulose ethers prepared according to the invention may be worked up into shaped structures or other useful articles by any process whatever known or proposed for the manufacture of shaped structures or other useful articles from alkali-soluble cellulose derivatives, viscose included, for instance by the processes described in U. S. Patents 1,722,928 or 2,327,358 or 2,327,359 or 2,265,917 or 2,306,451 or 2,265,918 or 2,231,927 or, 2,265,916, or 2,224,874, or British Patents 459,122 or 462,256, or British application No. 28,808/36.

The directions given in these specifications for the production of shaped structures from alkali-soluble cellulose ethers in general and from alkali-soluble hydroxy-alkyl derivatives of cellulose in particular are so thorough and detailed and, in addition, illustrated by so many examples that, instead of repeating the descriptions and statements in question, the inventor preferred to confine himself to a reference to the said specifications.

As stated above, the cellulose ethers prepared according to the present invention can be converted into their xanthates according to the processes described in U. S. Patents 1,858,097, 1,910,440, 2,021,861, 2,265,914, 2,265,917, 2,265,918 and 2,306,451 and in British Patents 459,122, 459,124, 462,283 and 462,456, and the thus obtained xanthates can be worked up into valuable shaped structures and other useful articles.

In this respect special attention is called by way of example to the seven methods described in Patent No. 1,858,097, to the nine methods described in British specification No. 462,456 and to the nine methods given in the inventor's U. S. Patent 2,296,856 and to the examples contained in these specifications.

Since the practice of the process of making xanthates of cellulose ethers and of working them up into shaped structures is exactly as set forth in the specifications set out in the foregoing two paragraphs and explained therein by numerous examples, it appears superfluous to repeat here all particulars relating to the conversion of the cellulose ethers prepared according to the invention into their xanthates and to the working up of these xanthates into shaped structures and other useful articles under various working conditions and to give here examples demonstrating all possible modifications of working the present invention.

With regard to the processes or methods for the conversion of the xanthates of the cellulose derivatives prepared according to the invention, special attention is called by way of example to the processes of British Patents 472,888 and 472,933 which, when applied to the xanthates of the present cellulose ethers, yield excellent shaped structures, at the same time economizing their production.

If desired, the extensibility of the shaped structures such as threads or film or coatings or the like produced according to the present invention from the cellulose ethers or from their xanthates may be increased by treating them either in the course of their manufacture, for example after coagulation and washing or in the finished wet or dry state with suitable shrinking agents, for example, with some of the shrinking agents mentioned in Patents Nos. 1,898,098, 2,001,621, 1,989,101, 1,989,100, 2,004,875 and 2,004,876.

Wherever the context permits, the term "alkali cellulose" means alkali cellulose prepared in the usual manner, namely by steeping cellulose in caustic alkali solution and removing the excess of the latter by pressing, or by mixing cellulose with such an amount of caustic alkali solution as is desired to be present in the final alkali cellulose.

The expression "etherification" used in the specification and claims covers alkylation or aralkylation or hydroxy-alkylation or production of hydroxy-acid derivatives, "ether" covers simple alkyl or aralkyl and hydroxy-alkyl or hydroxy-acid ethers and also mixed ethers, for example the mixed ethers herein before named.

The term "hydroxy-alkyl" is intended to include the halogenated or non-halogenated radicals of di- or polyvalent alcohols in conjunction with one or more oxygens or hydroxyls.

Wherever the context permits, the terms "alkyl," "alkylate," "alkylating agent," "alkylation" are intended to include unsubstituted or substituted (for example aralkyl groups) alkyl groups, alkylate with alkylating agents that contain unsubstituted or substituted (for example aralkyl groups) alkyl groups, alkylating agents that contain unsubstituted or substituted (for example aralkyl groups) alkyl groups, alkylation with alkylating agents that contain unsubstituted or substituted (for example aralkyl groups) alkyl groups.

The term "hydroxy-alkylating agents" is intended to include halogen derivatives of di- or polyhydric alcohols, particularly halohydrins, such as monohalohydrins and alkylene oxides.

In the specification and claims the expression "halogen fatty acid" or "monohalogen fatty acid" includes, wherever the context permits, monochlor-, monobrom- and monoiodo fatty acids themselves, their derivatives (such as esters) and their salts, as well as substances and mixtures of substances which yield monohalogen fatty acids or their derivatives.

The term "a cellulose ether" is intended to include a single ether or a mixture of two or more ethers (of the kinds defined herein) and it also includes simple or mixed ethers (of the kinds defined herein).

The term "alkali carbonate" used in the description and claims is, wherever the context permits, intended to include the primary and secondary alkali carbonates.

The expression "shaped structures" used in the specification and claims is intended to include: Artificial threads, particularly artificial silk and staple fibre, artificial hair, artificial straw, film of every kind, bands and plates of every kind, plastic masses of any description; adhesives and cements, finishes, coatings and layers of every kind, particularly such as are applicable in finishing, filling and dressing of textile fabrics, sizing of yarn, thickening agents or fixing agents for pigments in textile printing and the like; paper-like surfacing, paper-sizing; in the manufacture of artificial leather or of book cloth or of tracing cloth or of transparent paper or of transparent cloth and the like.

The term "artificial threads" denotes artificial threads and spun goods of all kinds, for instance artificial silk, artificial cotton, artificial wool, artificial hair and artificial straw of any kind.

The present application is a division of application Ser. No. 217,776 filed July 6, 1938, now abandoned which corresponds to a British application filed July 12, 1937 (British Patent 503,830).

The use of water as the precipitating agent, as described above, is claimed in a concurrently filed application, Serial No. 544,635.

What is claimed is:

1. A process of transforming a cellulose ether which will not readily dissolve substantially completely in aqueous caustic alkali solution at a temperature not considerably lower than room temperature into a product which will dissolve sufficiently in aqueous caustic alkali solution at the said temperature to give a solution sufficiently concentrated to be suitable for being shaped and coagulated to produce regenerated shaped structures, which process comprises dissolving such ether by maintaining a mixture containing such ether in aqueous caustic alkali solution together at a temperature near the freezing point until said ether has substantially completely dissolved and precipitating the desired product from the solution so produced by mixing together under agitation a bulk of said solution and a precipitant for the dissolved ether, which precipitant is capable of leaving a solution capable of neutralizing strong mineral acids, and which precipitant is selected from the group consisting of alkali carbonate, alkali bicarbonate, carbon dioxide, carbonic acid and mixtures thereof, and continuing such agitation and mixing until said ether is precipitated out of such solution, separating said precipitated ether from the mother liquor and thereafter redissolving same in an aqueous caustic alkali solution at a temperature substantially higher than the temperature at which said first dissolving step was accomplished, and in such redissolving step, using such proportions of the materials as to yield a solution of such cellulose ether of a sufficient concentration therein to be suitable for the direct production therefrom of shaped regenerated artificial structures by coagulation, the aqueous caustic alkali solution used in such second mentioned dissolving step being one which would not, at the temperature used in said second dissolving step, dissolve the initial cellulose ether.

2. A process for producing a solution suitable for the preparation of shaped structures, which process comprises refrigerating a mixture containing an undissolved cellulose ether, which ether will not dissolve substantially completely in caustic alkali solution at a temperature not substantially lower than room temperature, in caustic alkali solution until a formation of ice crystals occurs and until the said ether dissolves, and thereafter agitating a bulk of the solution thus obtained and during such agitation incorporating therewith a precipitant consisting essentially of at least one substance selected from the group consisting of alkali carbonate, alkali bicarbonate, carbon dioxide, carbonic acid and mixtures thereof, to produce a precipitate, and finally dissolving this precipitate in caustic alkali solution at a temperature much nearer to room temperature than that used in said first mentioned dissolving step to form a solution of the desired cellulose ether concentration, the said last mentioned caustic alkali solution being itself incapable of dissolving the initial cellulose ether at the temperature used in said second dissolving step.

3. A process as claimed in claim 1, wherein the said precipitation step is conducted at a temperature not substantially below room temperature.

4. A process of transforming a cellulose ether which will not readily dissolve substantially completely in aqueous caustic alkali solution at some given temperature not substantially lower than room temperature to produce a solution sufficiently concentrated in such cellulose ether to be suitable for being shaped and coagulated to produce regenerated shaped structures, which process comprises refrigerating a mixture containing such ether in aqueous caustic alkali solution to a temperature near ice temperature until said ether has substantially completely dissolved therein and afterwards precipitating the desired product from the solution so produced by mixing and agitating said solution in bulk with a precipitant for the dissolved ether which precipitant is itself incapable of neutralizing the alkali, and which precipitant is selected from the group consisting of alkali carbonate, alkali bicarbonate, carbon dioxide and carbonic acid and mixture thereof, to precipitate such dissolved ether, and thereafter dissolving the precipitated cellulose ether in an aqueous caustic alkali solution at a temperature much higher than the temperature at which the first mentioned dissolving operation was effected and the caustic alkali solution used in said second dissolving step being incapable of dissolving the initial cellulose ether at the temperature at which said second dissolving step is carried out.

ANTONIE LILIENFELD,
*Administratrix c. t. a. of the Estate of Leon Lilienfeld, Deceased.*

REFERENCES CITED

The following references are of record in the file of this patent:

UNITED STATES PATENTS

| Number | Name | Date |
|---|---|---|
| 798,027 | Ernst | Aug. 22, 1905 |
| 1,599,508 | Altwegg et al. | Sept. 14, 1926 |
| 1,814,208 | Dorr et al. | July 14, 1931 |
| 2,157,530 | Ellsworth et al. | May 9, 1939 |
| 2,190,445 | Ellsworth et al. | Feb. 13, 1940 |
| 2,249,754 | Ellsworth et al. | July 22, 1941 |
| 2,296,857 | Lilienfeld | Sept. 29, 1942 |